United States Patent [19]

Feist

[11] 4,454,177
[45] Jun. 12, 1984

[54] PROCESS TO IMPREGNATE THE CARBON CONSISTING OBJECTS

[76] Inventor: Horst J. Feist, Industriestrasse 4, 6969 Hardheim, Fed. Rep. of Germany

[21] Appl. No.: 385,466

[22] Filed: Jun. 7, 1982

[30] Foreign Application Priority Data

Nov. 27, 1981 [DE] Fed. Rep. of Germany ....... 3147040

[51] Int. Cl.³ .......................... B05D 1/18; B05D 3/00; B05D 3/02; C23C 13/08
[52] U.S. Cl. ..................................... 427/294; 118/50; 118/66; 118/69; 118/429; 427/374.1; 427/398.1; 427/430.1
[58] Field of Search .................... 118/50, 50.1, 66, 69, 118/429; 427/294, 350, 374.1, 398.1, 430.1

[56] References Cited

U.S. PATENT DOCUMENTS 4,114,562  9/1978  Ubaldi et al. ......................... 118/50
4,129,091 12/1978  France et al. ......................... 118/50
4,311,735  1/1982  Young ................................. 118/50 X

FOREIGN PATENT DOCUMENTS 142508  7/1980  Fed. Rep. of Germany ........ 118/50

Primary Examiner—Michael R. Lusignan
Attorney, Agent, or Firm—Collard, Roe & Galgano

[57] ABSTRACT

There is provided a method and apparatus for impregnating carbon articles with hot impregnating medium in a closed autoclave whereby the articles to be impregnated are introduced into the autoclave which is then closed and heated by means of a heat exchanger to the impregnating temperature at which point the impregnating medium is introduced to fill the autoclave and then pressurized to impregnate the articles. Subsequent to impregnation, the impregnating medium is removed from the autoclave and the closed or sealed autoclave and the impregnated articles are cooled to a temperature below a predetermined "lower limit temperature" and the articles are then removed from the autoclave. The "lower limit temperature" is chosen to eliminate the emission of harmful off-gases.

10 Claims, 6 Drawing Figures

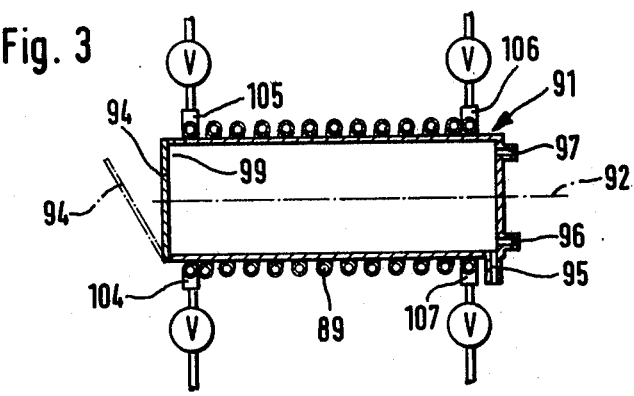
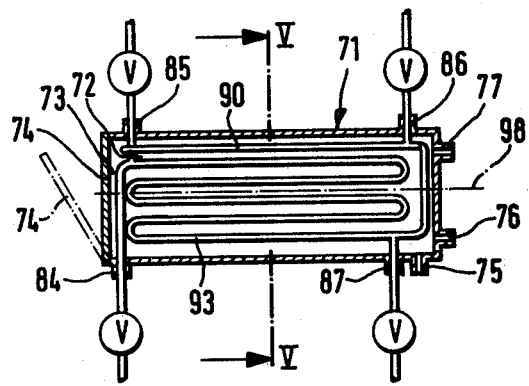
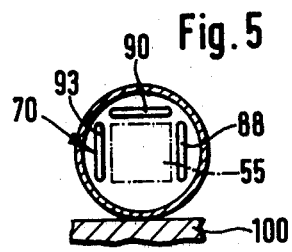
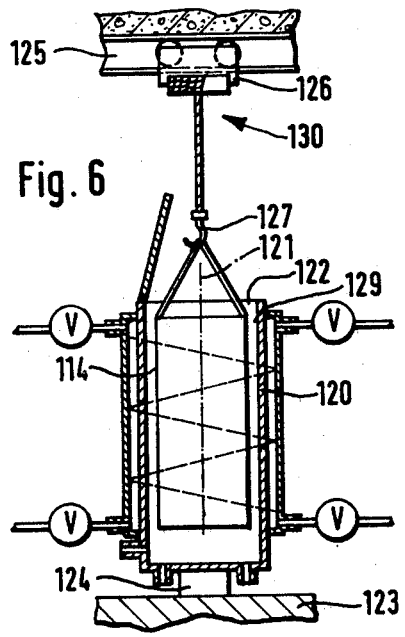

PROCESS TO IMPREGNATE THE CARBON CONSISTING OBJECTS

BACKGROUND OF THE INVENTION

The present invention relates to a method and apparatus for impregnating porous articles such as refractory bricks, graphite electrodes, transformer windings, and other carbon articles with an impregnating medium. More specifically, the present invention relates to a method and apparatus for impregnating such porous articles whereby the harmful and polluting gases are eliminated or substantially reduced.

Heretofore, in the process of impregnating carbon articles, the articles were impregnated with the impregnating medium in an autoclave and removed from the autoclave while still hot. Harmful polluting gases such as hydrocarbons, sulphurdioxid, nitric oxide, carbon monoxide and other gases are given off during this process and are left in the autoclave following the removal of the impregnating medium and are released when the autoclave is opened for the removal of the impregnated articles.

SUMMARY OF THE INVENTION

According to the method of the present invention, the carbon articles are placed in an autoclave, both being at a starting temperature below the "lower limit temperature", they are then heated to the impregnating temperature in the closed autoclave, the autoclave is then evacuated and held at this vacuum for a predetermined time, the preheated impregnating medium is then introduced to the autoclave. The impregnating medium is pressurized and this pressure and the impregnating temperature are held for a predetermined time until the articles are impregnated. The impregnating medium is removed at the end of the pressure holding time and the impregnated carbon articles and the closed autoclave are cooled to a temperature below a "lower limit temperature" and then the impregnated carbon articles are removed from the autoclave. The "lower limit temperature" is defined as the temperature at or below which no harmful gases are emitted by the impregnating medium or impregnated articles.

In the impregnation of refractory bricks, graphite electrodes and other carbon or carbon consisting articles, tar or pitch is utilized as the impregnating medium. For such impregnating media, the "lower limit temperature" is in the range of 50° to 100° Celsius and preferably a temperature of 80° Celsius.

For impregnating such articles as transformer windings, epoxy resin is used as an impregnating medium. The "lower limit temperature" for this impregnating medium is in the range from 50° to 120° Celsius and a temperature of 100° Celsius has been found to be acceptable in carrying out this process.

Most of the harmful off-gases which are emitted during the high temperature process and the cooling of the autoclave prior to unloading are precipitated out at the lower temperatures so that at the time the autoclave is opened for unloading of the impregnated carbon articles, only a small amount of such harmful gases escapes.

It is preferable to preheat the impregnating medium to the impregnating temperature for the dual purpose of energy conservation and for accelerating the process cycle.

The alternate heating and cooling of the autoclave is achieved simply by means of a single heat exchanger which has alternately passed through it heating or cooling heat carriers. Specifically, if a single heat exchanger is operated to alternately heat and cool, the same heat carrier, for example the same thermo oil, can also be used. Although minor mixing of the heating and cooling portions of the heat carrier can be avoided, the insignificant losses which arise during such mixings can be accommodated without disadvantage.

The apparatus for accomplishing this process includes an autoclave according to the present invention wherein there is provided an inlet connection and an outlet connection for the impregnating medium in the charging chamber, a connecting branch for a vacuum pump, an article charging opening and a heat exchanger. The article charging opening is provided with a pressure door which is sealed upon closing to thereby permit the inside pressure of the charging chamber of the autoclave to be controlled. The heat exchanger is adapted to heat or to cool the charging chamber of the autoclave.

The heat exchanger can be placed on the inside of the charging chamber of the autoclave or it can be constructed in the form of a jacket for the autoclave. Placement of the heat exchanger on the inside of the charging chamber is especially advantageous for energy conservation. A problem heretofore experienced with the prior art, that of harmful gases being emitted by the impregnating medium remaining in the autoclave after completion of the process and upon the opening of the autoclave, is hereby prevented in accordance with the present invention by the cooling of the charging chamber prior to the opening thereof. This placement of the heat exchanger on the inside of the charging chamber of the autoclave takes advantage of the energy savings resulting from such placement.

In another embodiment of the present invention, the autoclave is constructed as a long extended cylinder having a cylindrical jacket designed as a double wall. The jacket cavity has a spiral separate wall with the heating-cooling fluid lines placed along the cylinder. The autoclave has connections on both ends for these lines to the connecting branch to an outer cooling unit and an outer heating unit.

The heating and cooling units can both be operated with the same heat exchanger. In this case, it is necessary, during switching between heating and cooling, to take precautions so as not to mix both units. Different kinds of heat carriers can also be used for the two units in which case it is necessary for corresponding valves to be utilized so that the heat exchanger is emptied of one heat carrier before the other heat carrier is introduced thereto.

Preferably, thermo oil is used as a heat carrier, but other heat carriers, such as steam, water, synthetic heat carriers and salt solutions, can also be used. When steam is utilized as a heat carrier, it is condensed during the heating of the autoclave in the heat exchanger and then during cooling, the cooling liquid, as it is evacuated from the heat exchanger, is utilized to generate the steam for the next cycle.

BRIEF DESCRIPTION OF THE DRAWINGS

The present invention will be described and understood more readily when considered together with the accompanying drawings, in which:

FIG. 3 is a cross-sectional view of an embodiment of the autoclave according to the present invention which differs slightly from that of FIG. 1;

FIG. 4 is a cross-sectional view of another embodiment of the autoclave according to the present invention;

FIG. 5 is a cross-sectional view of the autoclave of FIG. 4 taken along the line V—V in FIG. 4; and FIG. 6 is a cross-sectional view of an upright autoclave according to the present invention.

DESCRIPTION OF THE PREFERRED EMBODIMENT

Figure 1:
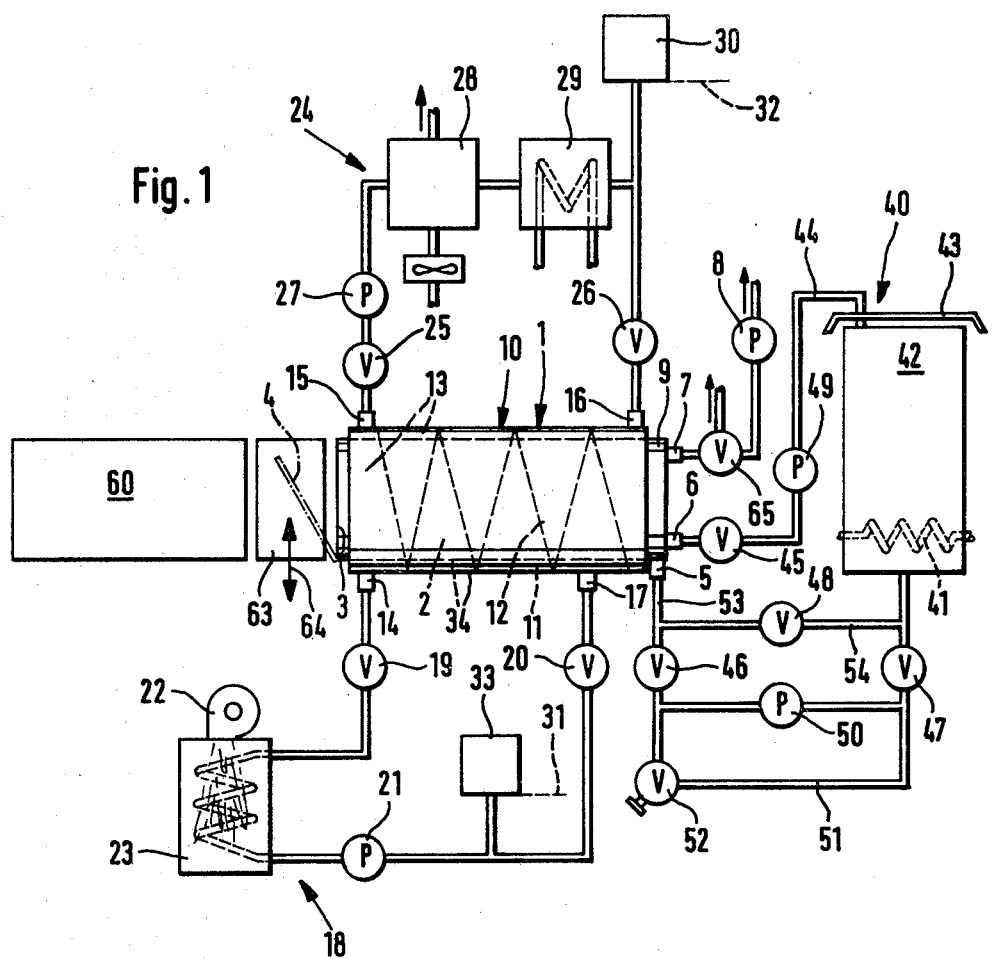
FIG. 1 is a diagrammatic plan view showing the autoclave according to the present invention, the charging direction and the other parts of the system indicated by means of the circuit diagram.
Figure 2:
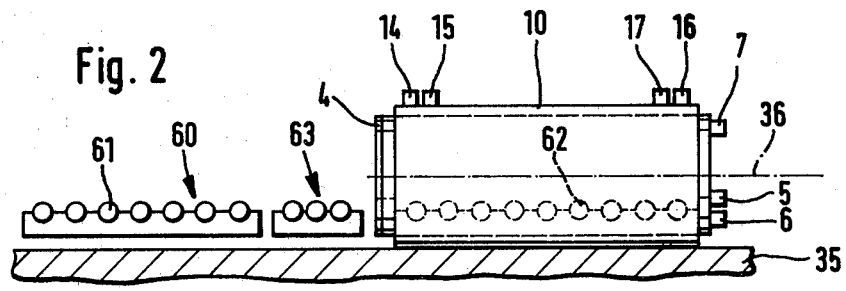
FIG. 2 is a side view of the autoclave and the charging direction of FIG. 1.

Now turning to the drawings, there is shown in FIGS. 1 and 2 an autoclave, designated 1, in the form of a long extended, horizontally situated cylinder having a pressure door 4, a charging opening 3 which is closed by door 4, and an impregnating chamber 2. Impregnating chamber 2 is provided with inlet connection 5 and outlet connection 6 for the impregnating medium and also with connection branch 7 for vacuum pump 8.

Autoclave 1 is supported on horizontal support 35 and has a substantially horizontal cylindrical axis 36.

Cylinder cover 9 of autoclave 1 is surrounded by heat exchanger 10 having a double wall 34 defining space cavity 11 wherein spiral separate wall 12 is arranged. Through cavity 11, a coil-like fluid line 13 is situated that extends from one end of the autoclave to the other end. Inlet connection 14 introduces hot thermo oil to fluid line 13 which is passed through and evacuated from the autoclave through outlet connection 17 at the other end of the autoclave. At the end of autoclave 1 where outlet connection 17 for the hot thermo oil is situated, there is provided opposite thereto an inlet connection 16 for the cold thermo oil which is then passed through and evacuated from the autoclave via outlet connection 15 at the other end of the autoclave.

Inlet connection 14 and outlet connection 17 are both connected via shut-off valves 19 and 20, respectively, to heating unit 18. Heating unit 18 includes a circulation pump 21 for pumping hot thermo oil through connections 14 and 17, a burner 22, flow heater 23 for the hot thermo oil and an expansion tank 33.

A cooling unit, designated 24, interconnects inlet and outlet connections 16 and 15, respectively, for the cold thermo oil by means of shut-off valves 26 and 25, respectively. Cooling unit 24 includes a circulating pump 27, an air heater type heat exchanger 28 and one water type heat exchanger 29 serving to cool the thermo oil and one expansion tank 30. Both expansion tanks 24 and 30 are arranged so that their lowest levels 31 and 32, respectively, are at least two meters above the highest levels of the thermo oil of the concerned unit and heat exchanger 10. Heating unit 18 and cooling unit 24 are operated with the same thermo oil as hot and cold mediums, respectively, and, therefore, it is desired to avoid as much as possible the mixing of the two oils for energy reasons. Both heating and cooling units are equipped with temperature tracers, thermostats and control devices which are not depicted in the drawings.

An impregnating medium unit, designated 40, is connected via inlet connection 5 and outlet connection 6 to impregnating chamber 2. Impregnating medium unit 40 is equipped with a heated storage tank 42 heated by heater 41 and having a gas catcher 43 for gas leaks. Storage tank 42 is connected with outlet connection 6 by means of return flow line 44 which in turn is equipped with a shut-off valve 45 and a supply pump 49. Storage tank 42 is connected to inlet connection 5 by means of inlet lines 53 equipped with two shut-off valves designated 46 and 47 and with a pressure supply pump 50. Pressure supply pump 50 is provided with a by-pass connected to return line 51 having relief valve 52 therein which is provided with an adjustable operating pressure. Shut-off valve 48 is provided on lockable by-pass branch 54 for inlet line 53.

In front of charging opening 3 there is provided a loading device 60 comprising a pallet carrier 61 aligned with pallet carrier 62 positioned on the bottom of impregnating chamber 2. In between these pallet carriers, there is arranged a carrier 63 that is movable in a direction of double arrows 64 of FIG. 1 and is positioned outside of autoclave 1. This carrier 63 permits the charging in turn of additional autoclaves positioned adjacent each other from the loading equipment installation.

Charging opening 3 also serves as an unloading opening. During unloading, loading device 60 serves as an unloading installation.

At connection 7 to impregnating chamber 2, a multiway valve 65 for ventilation is connected to the suction side of vacuum pump 8. With valves 45, 46, 48 and 65 in the shut-off position and pressure door 4 closed to the sealing position against charging opening 3, impregnating chamber 2 is pressure sealed from the outside atmosphere.

In operation, the pallets, loaded with articles to be impregnated, are taken into the autoclave 1 through the opened charging opening 3 from loading device 60. The charging articles as well as the autoclave are initially at a temperature not above the "lower limit temperature".

In the event that the loaded articles are pre-impregnated, it is insured that from this pre-impregnating no gases will be emitted because the elements are cold as they enter the autoclave.

As soon as the autoclave is charged, it is closed, pressure-sealed and locked. From heating unit 18, the hot thermo oil passes through the heat exchanger 10 until the autoclave reaches the impregnating temperature. As soon as the impregnating temperature is reached, impregnating chamber 2 will be evacuated by vacuum pump 8 and this vacuum will be held for a predetermined time, so-called the vacuum time. Subsequently, an impregnating medium which is pre-heated to the impregnating temperature at storage tank 42 is introduced to impregnating chamber 2 until the volume thereof is completely filled by the impregnating medium. The filled impregnating medium is pressurized by means of pressure pump 50 to an impregnating pressure and held for a predetermined time at such pressure. The impregnating medium is then pumped back to storage tank 42 by means of supply pump 49, thereby emptying impregnating chamber 2 of the impregnating medium to the greatest extent possible.

The heating medium in autoclave 1 will be kept at the impregnating temperature until the pumping out of the impregnating medium has begun. At that time, the heating unit 18 will be switched off and the heating medium removed from heat exchanger 10. When the impregnating medium has been evacuated from heat exchanger 10, cooling medium will be introduced to the heat exchanger until autoclave 1 and the contents inside are cooled to a temperature below the "lower limit temperature". When this occurs, cooling unit 24 will be shut off and the cooling medium removed from heat exchanger 10. Pressure door 4 if then opened and the impregnated articles on their pallets are removed through the charging opening 3 and the new articles to be impregnated will take their place, which will then be impregnated as described hereinabove.

Examples of the preferred design conditions including tolerances are given in the following Tables I to III:

TABLE I

Operational data for treating refractory bricks as articles to be impregnated

|  | Preferred Operational Data | Tolerance-Range |
|---|---|---|
| Lower limit temperature in °C. | 80 | 50–100 |
| Vacuum in torr | less than 10 | less than 10–18 |
| Vacuum time in minutes | 40 | 15–40 |
| Impregnating temperature in °C. | 230 | 100–280 |
| Pressure holding time in minutes | 40 | 15–90 |
| Impregnating pressure in bar | 4.5 | 3–25 |
| Impregnating medium | Tar OR Pitch | |

TABLE II

Operational data for treatment of transformer windings as articles to be impregnated

|  | Preferred Operational Data | Tolerance-Range |
|---|---|---|
| Lower limit temperature in °C. | 100 | 50–120 |
| Vacuum in torr | less than 10 | less than 10–18 |
| Vacuum time in minutes | 20 | 15–20 |
| Impregnating temperature in °C. | 100 | 30–120 |
| Pressure holding time in minutes | 20 | 15–20 |
| Impregnating pressure in bar | 15 | 5–20 |
| Impregnating medium | Epoxy resin | |

TABLE III

Operational data for treatment of anodic graphite electrodes and other carbon carrying objects as articles to be impregnated

|  | Preferred Operational Data | Tolerance-Range |
|---|---|---|
| Lower limit temperature in °C. | 80 | 50–100 |
| Vacuum in torr | less than 10 | less than 10–18 |
| Vacuum time in minutes | 20 | 10–45 |
| Impregnating temperature in °C. | 220 | 180–300 |
| Pressure holding time in minutes | 90 | 30–180 |
| Impregnating pressure in bar | 20 | 8–25 |
| Impregnating medium | Tar OR Pitch | |

The various autoclave examples shown in FIGS. 3 to 6 are different from the autoclave shown in FIGS. 1 and 2 only with respect to the arrangement and shaping of the autoclave and with respect to FIG. 6 the autoclave is different only in connection with the article charging thereof. In principle, these embodiments are similar to the autoclave according to FIGS. 1 and 2 and are operated in the same manner. With respect to FIGS. 3 to 6 those parts thereof that are not described can be assumed to have the same description as those parts shown in FIGS. 1 and 2.

The only difference between autoclave 91 of FIG. 3 and autoclave 1 of FIG. 1 is the arrangement of heat exchanger 89 which consists of a heating coil wound around the walls of autoclave 91. The inlet connections 14 and 16 in FIG. 1 correspond to the inlet connections 104 and 106 in FIG. 3. Outlet connections 15 and 17 of FIG. 1 correspond to outlet connections 105 and 107 of FIG. 3. Heat exchanger 89 is connected with a cooling unit corresponding to cooling unit 24 of FIG. 1 and to a heating unit corresponding to heating unit 18 of FIG. 1. Inlet connection 95 corresponds to inlet connection 5 for the impregnating medium of FIG. 1 and outlet connection 96 corresponds to outlet connection 6 for the impregnating medium of FIG. 1. The connection branch 97 corresponds to the connection branch 7 for evacuating the charging chamber in FIG. 1. Charging opening 99 is closed by pressure door 94. Autoclave 91 is installed horizontally and parallel to the plane of the supporting base plate substantially along its horizontal cylinder axis 92.

The difference between autoclave 71 of FIG. 4 and autoclave 1 of FIG. 1 is heat exchanger 70 which is arranged in the impregnating chamber 72 of autoclave 71 and consists of three coil assemblies designated 88, 90 and 93 that are connected and parallel to inlet connections 84 and 86 (corresponding to inlet connections 14 and 16 of FIG. 1) and to the outlet connections 85 and 87 (corresponding to outlet connections 15 and 17 of FIG. 1). The connections 75, 76 and 77 of FIG. 4 correspond to the connections 5, 6 and 7 of FIG. 1. Charging opening 73 is closed by pressure door 74. Autoclave 71 is placed on the horizontal support substantially along horizontal cylinder axis 98. Between the coil assemblies 88, 90 and 93 there is a place in impregnating chamber 72 for the driven pallet 55, as clearly seen in FIG. 5 in phantom.

Autoclave 120 of FIG. 6 is designed identically to autoclave 1 of FIG. 1 except that it has a vertical cylindrical axis 121 and a charging opening 122 and is installed on horizontal support 123 by means of a stand 124. Above autoclave 120 there are crane rails 125 movably supporting a trolley 126 in operation. The trolley is connected to lifting machine 130 with crane hook 127 to lift up the necessary loads. Article carrier 114, where the articles to be impregnated are laid, is hung to crane hook 127 to load and unload the autoclave. Article carrier 114 passes with the loaded articles from above into the impregnating chamber 129 and during impregnation is disconnected from crane hook 127.

It is to be understood that the foregoing general and detailed descriptions are explanatory of the present invention and are not to be interpreted as restrictive of the scope of the following claims.

I claim:

1. A method for impregnating porous articles to substantially eliminate the harmful gases resulting from such process, comprising the steps of:
   (a) introducing said porous articles to an impregnating chamber;
   (b) sealing said chamber to the outside atmosphere;
   (c) heating said sealed chamber and said porous articles to a predetermined impregnating temperature by means of a heat exchanger;

(d) evacuating said chamber to remove gases, moisture, oil, etc. from said porous articles;
(e) introducing impregnating medium into said sealed chamber to fill said chamber;
(f) pressurizing said impregnating medium filling said sealed chamber;
(g) maintaining said pressure and impregnating temperature for a predetermined time;
(h) removing as much of said impregnating medium as possible after said predetermined time;
(i) cooling by means of said heat exchanger said sealed chamber and said articles to a temperature less than the temperature at which harmful gases will be emitted by said impregnating medium; and
(j) removing said impregnated articles from said chamber.

2. The method as defined in claim 1, wherein the temperature of the articles introduced to said impregnating chamber and the temperature of said chamber at the time of said article introduction is less than the temperature at which harmful gases will be emitted by said impregnating medium.

3. The method as defined in claim 1, wherein the steps of heating and cooling said chamber and articles are accomplished by alternately introducing the same heat carrier medium to said heat exchanger, said heat carrier medium being at a higher impregnating temperature for heating said heat exchanger and being at a cooler temperature below the temperature at which said impregnating medium emits harmful gases for cooling said heat exchanger.

4. Apparatus for impregnating porous articles to substantially eliminate the harmful gases resulting from the process therefor, said apparatus comprising:
(a) an autoclave having an impregnating chamber for holding said articles, said impregnating chamber being sealed to the atmosphere;
(b) means to evacuate said impregnating chamber to thereby remove gases, moisture, oil, etc. from said porous articles;
(c) means for introducing heated impregnating medium to said impregnating chamber to fill said chamber and to remove said medium therefrom;
(d) means to pressurize said impregnating medium in said chamber to thereby impregnate said porous articles with said impregnating medium;
(e) a heat exchanger for heating and cooling said impregnating chamber;
(f) a heating unit for heating a heat carrier medium;
(g) a cooling unit for cooling a heat carrier medium; and
(h) means operatively connected to said heating and cooling units for alternately introducing and removing said heated and cooled heat carrier mediums to said heat exchanger to heat said chamber and said articles to impregnating temperature and to cool said chamber and said articles to a temperature below the temperature at which harmful gases will be emitted by said impregnating medium.

5. The apparatus as defined in claim 4, wherein said heat exchanger is in said impregnating chamber.

6. The apparatus as defined in claim 4 wherein said impregnating chamber is surrounded by a jacket and said heat exchanger is within said jacket.

7. The apparatus as defined in claim 6, wherein said autoclave is formed as a long extended cylinder having a double wall defining a space therebetween, a spiral partition panel in said space, the heat exchanger comprising fluid lines extending around said impregnating chamber within said space, connecting means at opposing ends of said autoclave for connecting said fluid lines to said heating unit, and connecting means at opposing ends of said autoclave for connecting said fluid lines to said cooling unit.

8. The apparatus as defined in claim 7, wherein said heating and cooling units are connected to said heat exchanger by means of a series of shut-off valves whereby the heating and cooling units may each be independently isolated from said heat exchanger.

9. The apparatus as defined in claim 7, wherein said autoclave is positioned so that its cylindrical axis is horizontal, said autoclave having a charging door at one end thereof, and wherein said means for loading inlcudes a first pallet handling device positioned to deliver articles through said charging door into said chamber and a second pallet handling device extending the length of said chamber aligned with said first pallet handling device.

10. The apparatus as defined in claim 7, wherein the cylindrical axis of said autoclave is positioned vertically, the top end of said autoclave having a charging door, a pallet carrier adapted to be inserted therein, and means outside said autoclave for lifting and lowering said pallet carrier therein.

* * * * *